United States Patent
Chen et al.

(10) Patent No.: US 10,515,253 B2
(45) Date of Patent: Dec. 24, 2019

(54) OPTICAL FINGERPRINT SENSOR

(71) Applicant: VisEra Technologies Company Limited, Hsin-Chu (TW)

(72) Inventors: Hao-Min Chen, Chiayi (TW); Hsin-Wei Mao, Hsinchu (TW); Han-Lin Wu, Hsin-Chu (TW)

(73) Assignee: VISERA TECHNOLOGIES COMPANY LIMITED, Hsin-Chu (TW)

( * ) Notice: Subject to any disclaimer, the term of this patent is extended or adjusted under 35 U.S.C. 154(b) by 77 days.

(21) Appl. No.: 15/855,122

(22) Filed: Dec. 27, 2017

(65) Prior Publication Data
US 2019/0197290 A1    Jun. 27, 2019

(51) Int. Cl.
*G06K 9/00* (2006.01)

(52) U.S. Cl.
CPC ....... *G06K 9/00046* (2013.01); *G06K 9/0008* (2013.01)

(58) Field of Classification Search
CPC ............. G06K 9/00046; G06K 9/0008; G06K 9/0004; G06K 9/2027; G06K 9/2036; G02B 27/30; G02B 6/005
USPC ........................................................ 382/127
See application file for complete search history.

(56) References Cited

U.S. PATENT DOCUMENTS

| | | | |
|---|---|---|---|
| 6,292,576 B1 | 9/2001 | Brownlee | |
| 2003/0118219 A1* | 6/2003 | Higuchi | G06K 9/00046 382/125 |
| 2004/0252867 A1* | 12/2004 | Lan | G06K 9/0004 382/124 |
| 2006/0158458 A1* | 7/2006 | Kojima | G09G 3/3233 345/592 |
| 2008/0123908 A1* | 5/2008 | Waldman | G06K 9/00046 382/124 |
| 2016/0224816 A1* | 8/2016 | Smith | G02B 27/58 |
| 2017/0161540 A1* | 6/2017 | Mienko | G06F 3/0421 |
| 2017/0286743 A1 | 10/2017 | Lee et al. | |
| 2017/0357841 A1 | 12/2017 | Popovich et al. | |
| 2018/0357460 A1* | 12/2018 | Smith | G06K 9/4661 |

FOREIGN PATENT DOCUMENTS

| | | |
|---|---|---|
| CN | 10550664 A | 5/2016 |
| TW | M553019 U | 12/2017 |
| TW | M553454 U | 12/2017 |
| WO | WO-2017/062506 | 4/2017 |

OTHER PUBLICATIONS

Office Action based on Tawainese Application No. 107137897, dated Apr. 16, 2019.
Office Action based on Japanese Application No. 2018-086476, dated Jun. 25, 2019.

* cited by examiner

*Primary Examiner* — Ali Bayat
(74) *Attorney, Agent, or Firm* — Muncy, Geissler, Olds & Lowe, P.C.

(57) ABSTRACT

An optical fingerprint sensor, includes: an image sensor array; a collimator layer disposed above the image sensor array, the collimator array having an array of first apertures; a light guiding layer disposed on the collimator layer; a light source emitting light into the light guiding layer; and a sensing area disposed above the light guiding layer. The light guiding layer allows a portion of the light from the light source to enter to the sensing area while directing the remaining portion of the light forward.

10 Claims, 5 Drawing Sheets

OPTICAL FINGERPRINT SENSOR

BACKGROUND OF THE INVENTION

Field of the Invention

The present disclosure relates to an optical fingerprint sensor, and in particular to an optical fingerprint sensor having a light guiding layer which reduces light losses in the transmission and outputs light uniformly to a sensing area.

Description of the Related Art

Biometric recognition has been very popular in recent years. A kind of biometric recognition system is a fingerprint recognition system. A fingerprint recognition system images the fingerprint of a user to authenticate the user and decides whether or not to allow the user to access the device incorporating the fingerprint recognition system. Fingerprint recognition systems may be used to provide access control in mobile devices, such as cell phones, wearable electronic devices (e.g., smart watches), and tablet computers.

Capacitive fingerprint sensors are most commonly adopted in fingerprint recognition systems. However, a capacitive fingerprint sensor has difficulty sensing fine ridge and valley features of a finger over a large distance. It would be a problem if the capacitive fingerprint sensor is embedded under a thick glass cover of a device. A solution for this issue is to utilize an optical fingerprint sensor to replace the capacitive fingerprint sensor. The optical fingerprint sensor can sense the fingerprint even though the fingerprint contacts the surface of the cover glass which is not close to the sensor array.

Existing optical fingerprint sensors have a light source to illuminate a sensing area where a finger touches, and utilize an image sensor array to receive the light reflected from the sensing area. The light reflected by the ridge of the finger and the light reflected by the valley of the finger have different intensities. Thus, the image sensor array can image the ridge and valley features of a finger. However, it is difficult for the light source to illuminate the sensing area uniformly. If the light source doesn't illuminate the sensing area uniformly, fine image quality or high recognition accuracy cannot be achieved.

BRIEF SUMMARY OF THE INVENTION

A detailed description is given in the following embodiments with reference to the accompanying drawings.

The disclosure provides an optical fingerprint sensor, including: an image sensor array, a collimator layer, a light guiding layer a light source and a sensing area. The collimator layer is disposed above the image sensor array. The collimator array has an array of first apertures. The light guiding layer is disposed on the collimator layer. The sensing area is disposed above the light guiding layer. The light guiding layer allows a portion of the light from the light source to enter to the sensing area while directing the remaining portion of the light forward.

In the optical fingerprint sensor above, the light guiding layer includes: a bottom light guiding layer; a middle light guiding layer disposed on the bottom light guiding layer, and a top light guiding layer disposed on the middle light guiding layer, the top light guiding layer having an array of second apertures. The refractive indices of the bottom light guiding layer and the top light guiding layer are lower than the refractive index of the middle light guiding layer.

In the optical fingerprint sensor above, each of the second apertures is located directly above one of the first apertures.

In the optical fingerprint sensor above, the image sensor array includes a plurality of image sensor units which receive the light that is reflected from a sensing area and transmitted through one of the second apertures and one of the first apertures.

In the optical fingerprint sensor above, each of the first apertures has a side wall made of a first material, and is filled with a second material, wherein the refractive index of the first material is lower than that of the second material. In an embodiment, the bottom light guiding layer and the top light guiding layer are made of the first material, and the middle light guiding layer is made of the second material.

According to another aspect of the disclosure, in the optical fingerprint sensor above, the optical fingerprint sensor above further includes the light guiding layer having an array of prisms.

In the optical fingerprint sensor above, each of the prisms is located directly above one of the first apertures.

In the optical fingerprint sensor above, each of the prisms reflects a portion of incident light to the sensing area and passes the remaining portion of the incident light.

In an embodiment, the image sensor array comprises a plurality of image sensor units which receive the light beam that is reflected from the sensing area and transmitted through one of the first apertures. In another embodiment, each of the apertures has a side wall made of a first material, and is filled with a second material, wherein the refractive index of the first material is lower than that of the second material.

According to another aspect of the disclosure, in the optical fingerprint sensor above, the light guiding layer comprises an array of material blocks. An interface between any two adjacent material blocks is an inclined plane. Each inclined plane is located directly above one of the first apertures.

In the optical fingerprint sensor above, each inclined plane reflects a portion of the light to the sensing area and passes the remaining portion of the light.

In the optical fingerprint sensor above, the image sensor array comprises a plurality of image sensor units which receive the light beam reflected from the sensing area and transmitted through one of the first apertures. In another embodiment, each of the apertures has a side wall made of a first material, and is filled with a second material, wherein the refractive index of the first material is lower than that of the second material.

In conclusion, the disclosure provides an optical fingerprint sensor having a light guiding layer which reduces light losses in the transmission and outputs light uniformly to a sensing area. Furthermore, the light guiding layer can prevent the image sensor array from receiving stray light which is not reflected by the fingerprint.

BRIEF DESCRIPTION OF THE DRAWINGS

The present invention can be more fully understood by reading the subsequent detailed description and examples with references made to the accompanying drawings, wherein.

DETAILED DESCRIPTION OF THE INVENTION

Figure 1:
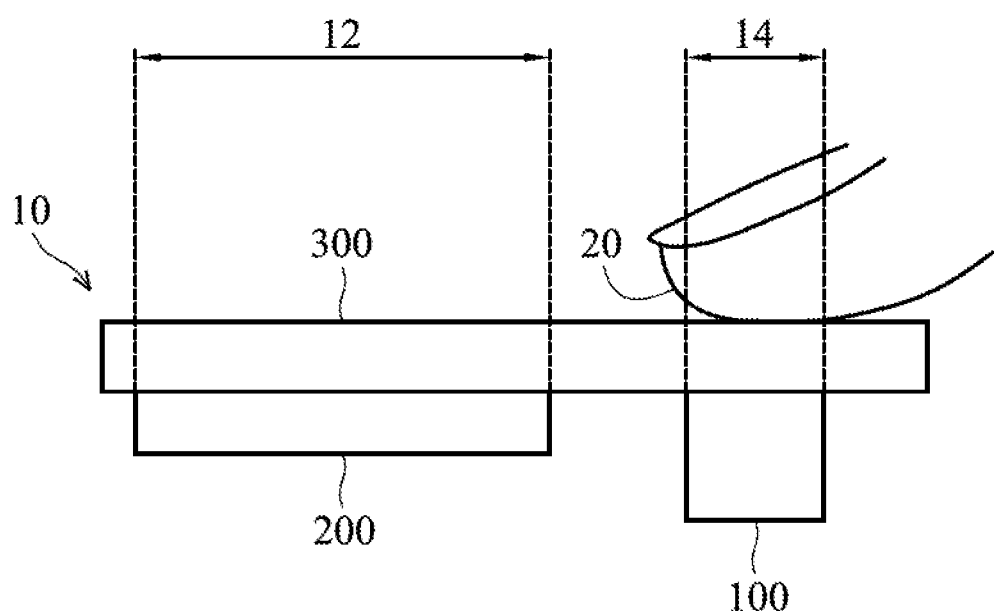
FIG. 1 is a schematic diagram of a mobile device that has cover glass over a display panel and an optical fingerprint sensor in accordance with an embodiment of the disclosure.

The following disclosure provides many different embodiments, or examples, for implementing different features of the present disclosure. Specific examples of components and arrangements are described below to simplify the present disclosure. For example, the formation of a first feature over or on a second feature in the description that follows may include embodiments in which the first and second features are formed in direct contact, and may also include embodiments in which additional features may be formed between the first and second features, such that the first and second features may not be in direct contact.

In addition, the present disclosure may repeat reference numerals and/or letters in the various examples. This repetition is for the purpose of simplicity and clarity and does not in itself dictate a relationship between the various embodiments and/or configurations discussed. Furthermore, the shape, size, and thickness in the drawings may not be drawn to scale or may be simplified for clarity of discussion; rather, these drawings are merely intended for illustration.

Embodiments of the disclosure provide optical fingerprint sensors to optically image a fingerprint. In particular, the disclosure describes an optical fingerprint sensor having a light guiding layer interposed between a cover glass layer and a collimator layer. Light from a light source is transmitted in the light guide layer and incident to a sensing area where a finger touches. The light is reflected by the finger and filtered by the light guiding layer and the collimator layer, such that only the light reflected from the finger at a small angle of incidence to the light guide layer and the collimator layer can reach the image sensor array.

FIG. 1 is a schematic diagram of a mobile device that has cover glass over a display panel and an optical fingerprint sensor in accordance with an embodiment of the disclosure. As shown in FIG. 1, a mobile device 10 includes an optical fingerprint sensor 100, a display panel 200, and cover glass 300 covering the optical fingerprint sensor 100 and the display panel 200. The display panel 200 is disposed in a display area 12 and shows images to users. The optical fingerprint sensor 100 is disposed in a sensing area 14 where a finger 20 can be placed for fingerprint recognition. The optical fingerprint sensor 100 senses the user's fingerprint to determine whether or not to allow the user to operate the mobile device.

Figure 2:
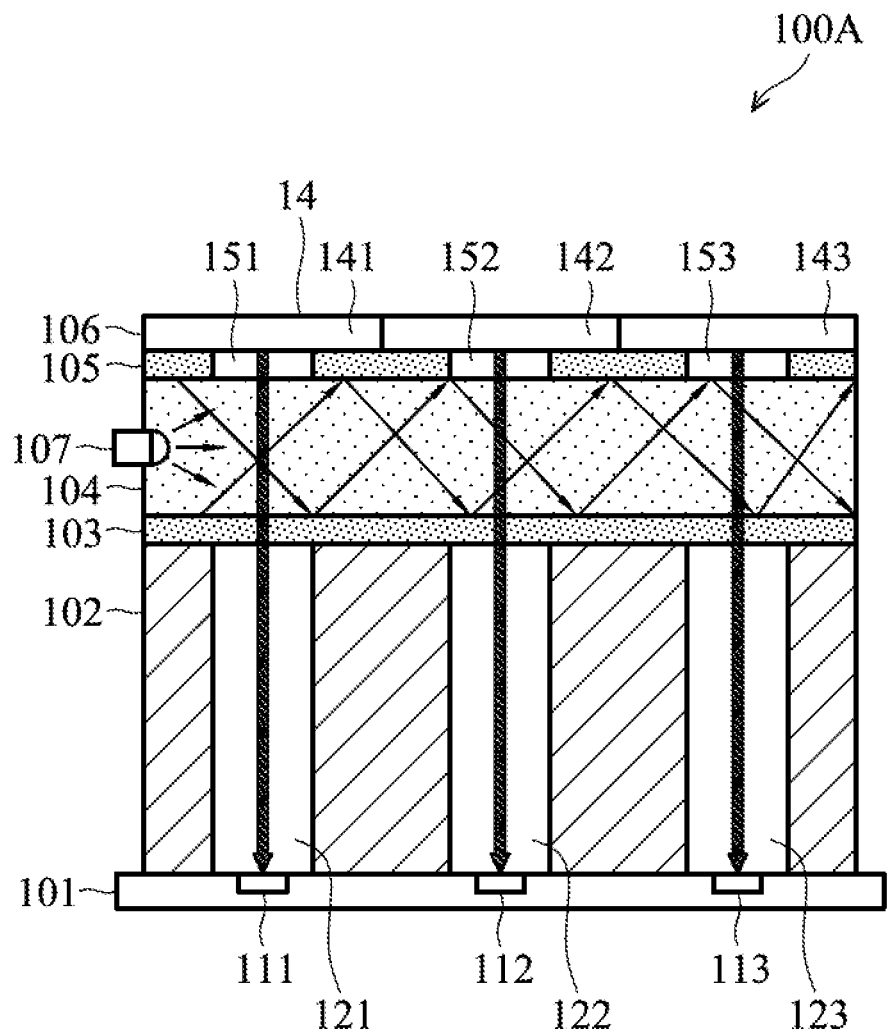
FIG. 2 is a schematic diagram showing an optical fingerprint sensor in accordance with an embodiment of the disclosure.

FIG. 2 is a schematic diagram showing an example of the optical fingerprint sensor 100 shown in FIG. 1 in accordance with an embodiment of the disclosure. In FIG. 2, the optical fingerprint sensor 100A includes an image sensor array 101, a collimator layer 102 disposed on the image sensor array 101, a bottom light guiding layer 103 disposed on the collimator layer 102, a middle light guiding layer 104 disposed on the bottom light guiding layer 103, a top light guiding layer 105 disposed on the middle light guiding layer 104, a cover layer 106 disposed on the top light guiding layer 105, and a light source 107 emitting light into the middle light guiding layer 104.

The cover layer 106 corresponds to the cover glass 300 shown in FIG. 1, which protects the entire optical fingerprint sensor 100A. The upper surface of the cover layer 106 is the sensing area 14 which provides a contact area for the finger. The cover layer 106 is made of a transparent material such as glass, which has high light transmittance.

The feature of a fingerprint is composed of ridges and valleys. In this embodiment, it is assumed that portion 141 of the sensing area 14 is in contact with the ridge of the fingerprint, portion 142 of the sensing area 14 is in contact with the valley of the fingerprint, and portion 143 of the sensing area 14 is in contact with the ridge of the fingerprint. The light reflected by the ridge of the fingerprint has different intensity than the light reflected by the valley of the fingerprint, and the optical finger sensor 100A can use this characteristic to image the fingerprint.

The image sensor array 101 includes a plurality of image sensor units 111, 112, and 113, which are arranged for detecting the intensity of the light coming from portion 141 of the sensing area 14, portion 142 of the sensing area 14, and portion 143 of the sensing area 14. The image sensor array 101 can be implemented by a CMOS sensor array or a CCD sensor array.

The collimator layer 102 is made of light absorption materials and has an array of apertures or holes 121, 122, and 123. The apertures 121, 122, and 123 are located right above the image sensor units 111, 112, and 113. Therefore, only light at normal incidence or near normal incidence to the image sensor array 101 can pass through the apertures 121, 122, and 123 of the collimator layer 102 and reach the image sensor units 111, 112, and 113. Light having a slightly large angle of incidence with respect to the collimator layer 102 is absorbed by the upper surface of the collimator layer or the side wall of the apertures 121, 122, and 123. In this regard, the collimator layer 102 functions as a collimator which collimates the light incident to the image sensor array 101. By utilizing the collimator layer 102, the image sensor units 111, 112, and 113 can respectively receive the light from portion 141 of the sensing area 14, portion 142 of the sensing area 14, and portion 143 of the sensing area 14.

The bottom light guiding layer 103, the middle light guiding layer 104, and the top light guiding layer 105 constitute a light guiding group. The bottom light guiding layer 103 and the top light guiding layer 105 can be made of the same or different materials. However, the bottom light guiding layer 103 and the top light guiding layer 105 must have refractive indices lower than the middle light guiding layer 104. In this embodiment, it is assumed that the bottom light guiding layer 103 and the top light guiding layer 105 are made of the same material. The bottom light guiding layer 103, the middle light guiding layer 104, and the top light guiding layer 105 forms a light guiding layer that allows a portion of the light from the light source to enter to the sensing area while directing the remaining portion of the light forward.

According to Snell's law, if light passes through a boundary between two different media, the ratio of the sines of the angles of incidence and refraction is equivalent to the reciprocal of the ratio of the refraction indices of the two media. In this way, when light travels from a medium with a higher refractive index to one with a lower refractive index, the angle of refraction is greater than the angle of incidence. In this case, if light incident to the boundary has an angle of incidence larger than a critical angle, the light will be completely reflected by the boundary. In this way, when the light source 107 emits light into the middle light guiding layer 104 from an edge of the middle light guiding layer 104, since the bottom light guiding layer 103 and the top light guiding layer 105 have a refractive index lower than that of the middle light guiding layer 104, the light transmitted in the middle light guiding layer 104 with large angle of incidence to the boundary will be completely reflected by the boundary and continue toward the opposite edge of the middle light guiding layer 104.

In the total internal reflection structure of the light guiding group, the top light guiding layer 105 has an array of apertures or holes 151, 152, and 153. The apertures 151, 152, and 153 are located right above the apertures 121, 122, and 123 (or the image sensor units 111, 112, and 113). Therefore, the light reflected in the middle light guiding layer 104 can be output from the apertures 151, 152, and 153 and incident to the portion 141 of the sensing area 14, portion 142 of the sensing area 14, and portion 143 of the sensing area 14, respectively.

The light beams reflected from the sensing area 14 have different angles of incidence to the light guiding group. However, if the light beam has an angle of incidence larger than the critical angle, it will be reflected by the bottom light guiding layer 103 and cannot enter the collimator layer 102. In this way. Only light at normal incidence or near normal incidence to the light guiding group can pass through the light guiding group and the collimator layer 102 and reach the image sensor units 111, 112, and 113.

According to the above embodiment, the optical fingerprint sensor 100A has a light guiding group formed from materials with different refractive indices, which reflects light totally. Therefore, light losses in the transmission are reduced and the sensing area 14 can be illuminated uniformly. Furthermore, the light guiding group can also prevent the image sensor array 101 from receiving stray light which is not reflected by the fingerprint.

Figure 3:
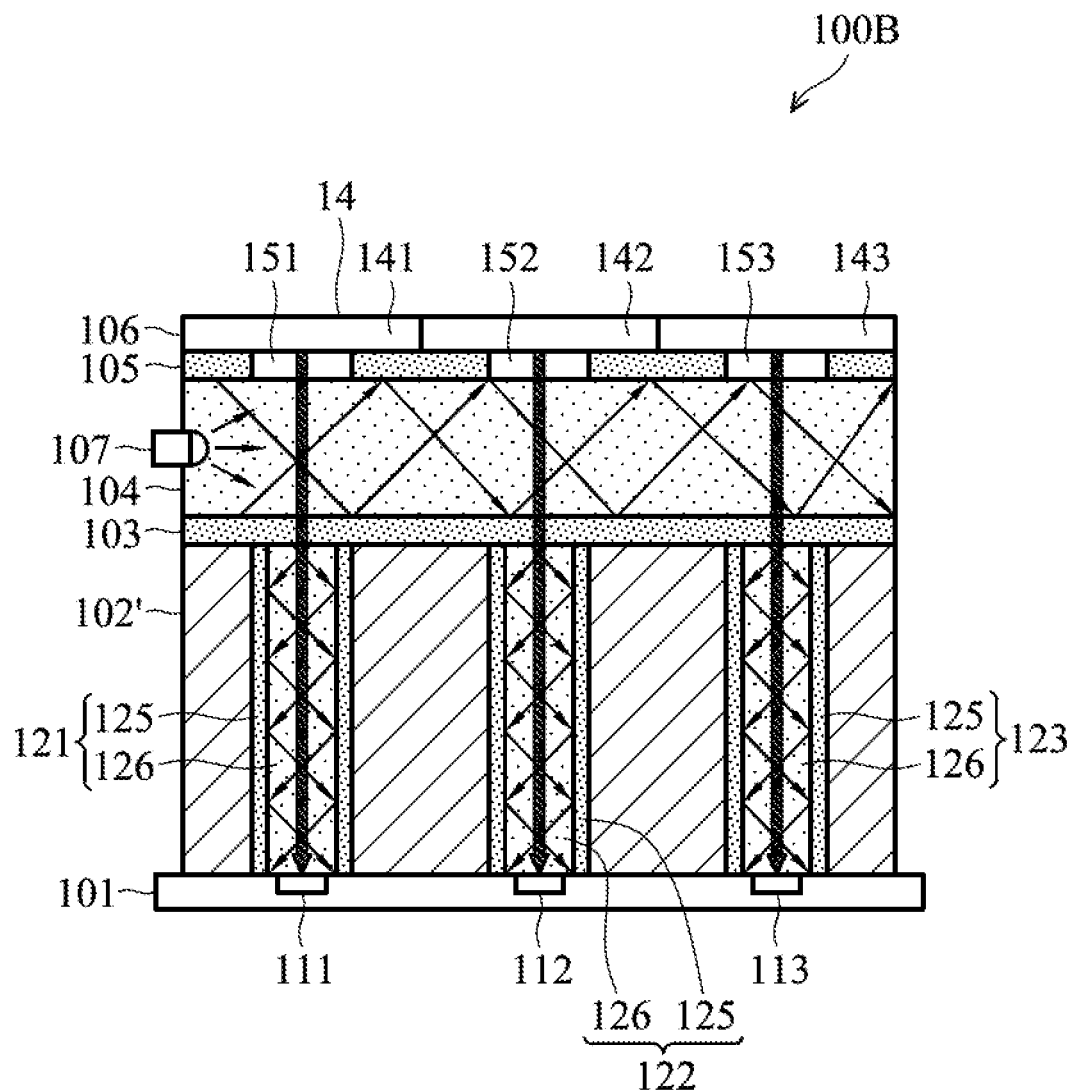
FIG. 3 is a schematic diagram showing an optical fingerprint sensor in accordance with an embodiment of the disclosure.

FIG. 3 is a schematic diagram showing another example of the optical fingerprint sensor 100 shown in FIG. 1 in accordance with an embodiment of the disclosure. In FIG. 3, an optical fingerprint sensor 100B is shown, wherein the collimator layer 102' is different from the collimator layer 102 of the optical fingerprint sensor 100A. The other elements of the optical fingerprint sensor 100B are the same as those of the optical fingerprint sensor 100A (the element numerals are also unchanged), and descriptions of those elements of the optical fingerprint sensor 100B are omitted.

In the collimator layer 102', each of the apertures 121, 122, and 123 has a side wall 125 and the center of the apertures 121, 122, and 123 are filled with a material 126. The refractive index of the side wall 125 is lower than that of the material 126. Namely, the aperture of the collimator layer 102' also forms a total internal reflection tube. In this way, some light beams having large angles of incidence to the side wall 125 of the aperture 121, 122, or 123 can be completely reflected by the side wall 125 and transmitted in the aperture 121, 122, or 123 to the image sensor unit 111, 112, or 113. In comparison with optical fingerprint sensor 100A, the image sensor array 101 of the optical fingerprint sensor 100B can collect more light beams, ensuring that the light intensity is enough to be sensed by the image sensor unit 111, 112, or 113.

For ease of manufacturing, the material of the side wall 125 can be the same as that of the bottom light guiding layer 103 and the top light guiding layer 105, and the material 126 can be the same as that of the middle light guiding layer 104. Note that this structure can still prevent light beams having a large angle with respect to the vertical line from reaching the image sensor array 101. Those light beams have small angles of incidence to the side wall 125 and thus will pass the side wall 125 and be absorbed by the body of the collimator layer 102'.

Figure 4:
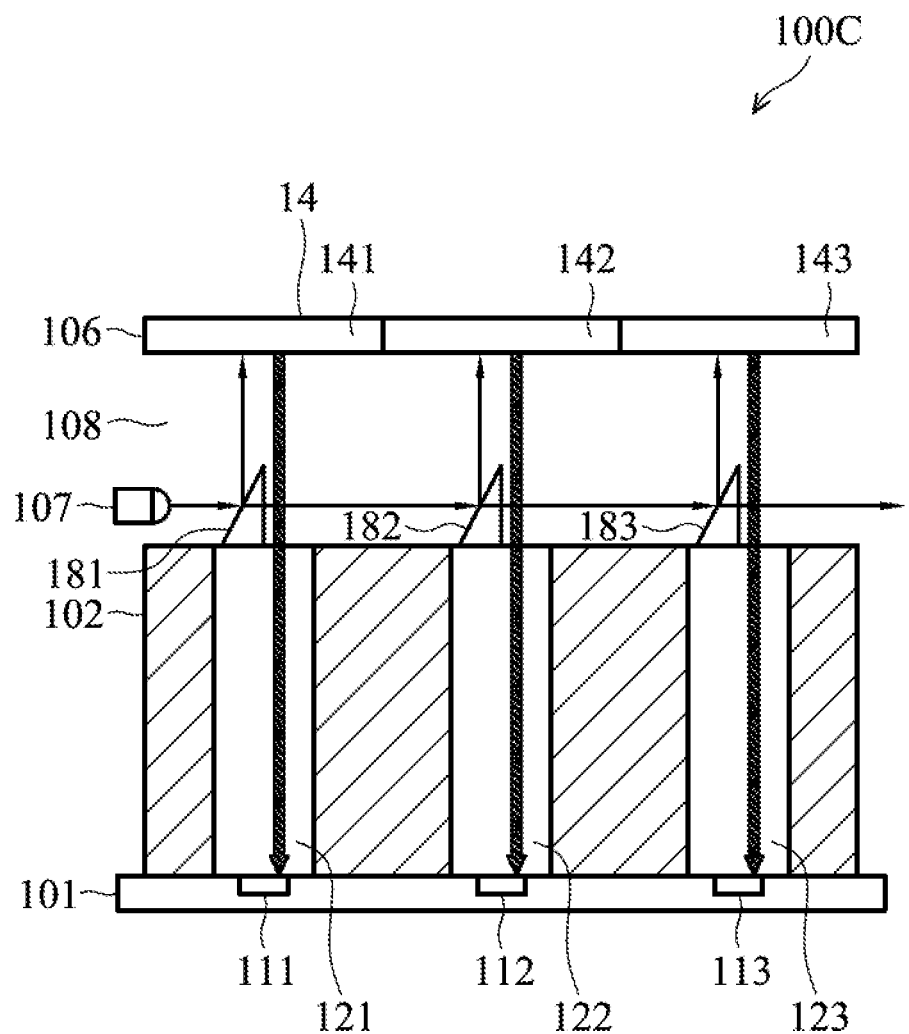
FIG. 4 is a schematic diagram showing an optical fingerprint sensor in accordance with an embodiment of the disclosure.

FIG. 4 is a schematic diagram showing another example of the optical fingerprint sensor 100 shown in FIG. 1 in accordance with an embodiment of the disclosure. In FIG. 4, an optical fingerprint sensor 100C includes an image sensor array 101, a collimator layer 102 disposed on the image sensor array 101, a light guiding layer 108 disposed on the collimator layer 102, a cover layer 106 disposed on the light guiding layer 108, and a light source 107 emitting light into the middle light guiding layer 104. The image sensor array 101, the collimator layer 102, the cover layer 106, and the light source 107 are the same as those in the optical fingerprint sensor 100C shown in FIG. 2, and descriptions of those elements are omitted.

In the light guiding layer 108, there are prisms 181, 182, and 183 disposed right above the apertures 121, 122, and 123, respectively. The prisms 181, 182, and 183 are transparent optical elements with a surface for reflecting a portion of the incident light and refracting the remaining portion of the incident light. For example, the prism 181 reflects a portion of incident light to the portion 141 of the sensing area 14 and passes (or refracts) the remaining portion of the incident light. The light passing through the prism 181 will be incident to the prism 182. The prism 182 does the same thing as the prism 181: reflecting a portion of light to the portion 142 of the sensing area 14 and passing (or refracting) the remaining portion of light. The light passing through the prism 182 will be incident to the prism 183, and the prism 182 does the same thing as the prisms 181 and 182. The image sensor units 111, 112, and 113 receive the light reflected from portion 141 of the sensing area 14, portion 142 of the sensing area 14, and portion 143 of the sensing area 14 and passing through the apertures 121, 122, and 123 of the collimator layer 102.

According to the above embodiment, the optical fingerprint sensor 100C has a light guiding layer 108 having prisms 181, 182, and 183. With this structure, light losses in the transmission are reduced and the sensing area 14 can be illuminated uniformly.

Figure 5:
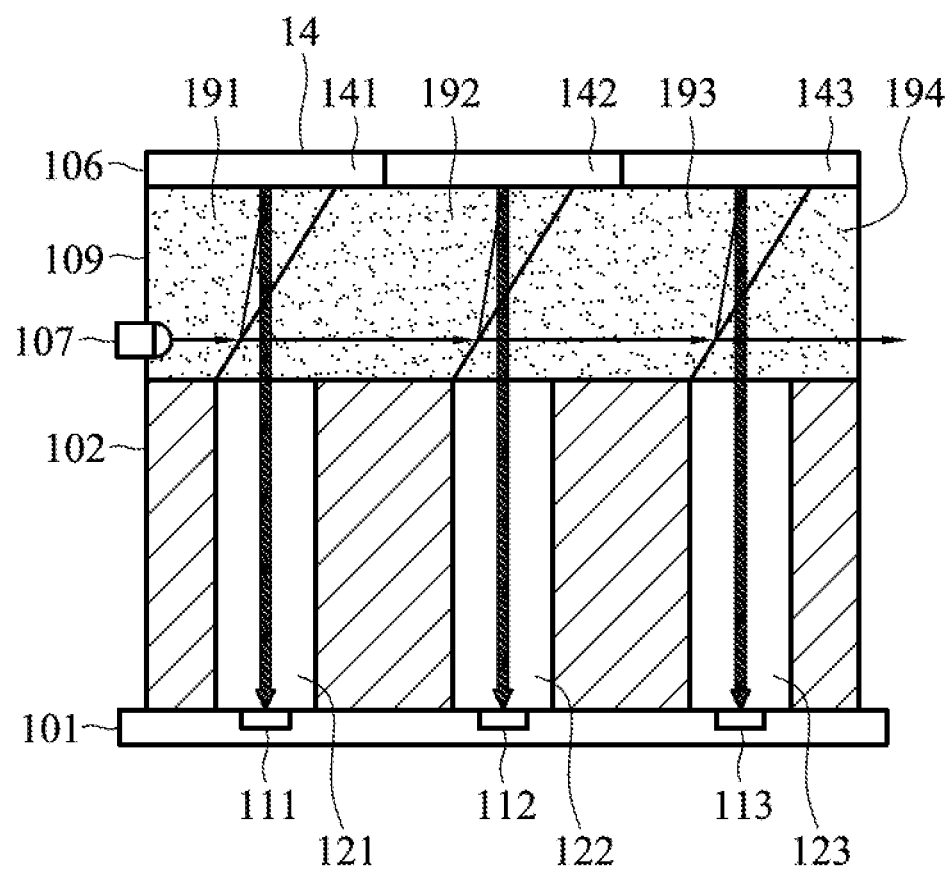
FIG. 5 is a schematic diagram showing an optical fingerprint sensor in accordance with an embodiment of the disclosure.

FIG. 5 is a schematic diagram showing another example of the optical fingerprint sensor 100 shown in FIG. 1 in accordance with an embodiment of the disclosure. In FIG. 5, an optical fingerprint sensor 100D is shown, wherein the light guiding layer 109 is different from the light guiding layer 108 of the optical fingerprint sensor 100C. The other elements of the optical fingerprint sensor 100D are the same as those of the optical fingerprint sensor 100C (the element numerals are also unchanged), and descriptions of those elements of the optical fingerprint sensor 100D are omitted.

The light guiding layer 109 also uses prism theory, the light guiding layer 109 includes an array of material blocks. As shown in FIG. 5 for example, there are material blocks 191, 192, 193, and 194. The interface between material blocks 191 and 192 is an inclined plane. This inclined plane is located right above the aperture 102. A portion of light incident to the interface between material blocks 191 and 192 will be reflected to the portion 141 of the sensing area 14 and the remaining portion of light passes through the interface. The interface between material blocks 192 and 193 and the interface between material blocks 193 and 194 are respectively right above the aperture 103 and 104. The interface between the material blocks 192 and 193 reflects a portion of light to the portion 142 of the sensing area 14 and passes the remaining portion of light. The interface between material blocks 193 and 194 reflects a portion of light to the portion 143 of the sensing area 14 and passes the remaining portion of light. The image sensor units 111, 112, and 113 receive the light reflected from portion 141 of the sensing area 14, portion 142 of the sensing area 14, and portion 143 of the sensing area 14 and passing through the apertures 121, 122, and 123 of the collimator layer 102.

In conclusion, the disclosure provides an optical fingerprint sensor having a light guiding layer which reduces light losses in the transmission and outputs light uniformly to a sensing area. Furthermore, the light guiding layer can prevent the image sensor array from receiving stray light which is not reflected by the fingerprint.

While the invention has been described by way of example and in terms of the preferred embodiments, it should be understood that the invention is not limited to the disclosed embodiments. On the contrary, it is intended to cover various modifications and similar arrangements (as would be apparent to those skilled in the art). For example, the structure of the collimator layer 102' shown in FIG. 3 can be applied to FIG. 4 and FIG. 5 to replace the collimator layer 102. Therefore, the scope of the appended claims should be accorded the broadest interpretation so as to encompass all such modifications and similar arrangements.

What is claimed is:

1. An optical fingerprint sensor, comprising:
   an image sensor array;
   a collimator layer disposed above the image sensor array, the collimator array having an array of first apertures;
   a light guiding layer disposed on the collimator layer;
   a light source emitting light into the light guiding layer; and
   a sensing area disposed above the light guiding layer,
   wherein the light guiding layer allows a portion of the light from the light source to enter to the sensing area while directing the remaining portion of the light forward,
   wherein the light guiding layer comprises:
   a bottom light guiding layer;
   a middle light guiding layer disposed on the bottom light guiding layer; and
   a top light guiding layer disposed on the middle light guiding layer, the top light guiding layer having an array of second apertures, and
   wherein the refractive indices of the bottom light guiding layer and the top light guiding layer are lower than the refractive index of the middle light guiding layer.

2. The optical fingerprint sensor as claimed in claim 1, wherein each of the second apertures is located directly above one of the first apertures.

3. The optical fingerprint sensor as claimed in claim 1, wherein the image sensor array comprises a plurality of image sensor units which receive the light reflected from a sensing area and transmitted through one of the second apertures and one of the first apertures.

4. The optical fingerprint sensor as claimed in claim 1, wherein each of the first apertures has a side wall made of a first material, and is filled with a second material, wherein the refractive index of the first material is lower than that of the second material.

5. The optical fingerprint sensor as claimed in claim 4, wherein the bottom light guiding layer and the top light guiding layer are made of the first material, and the middle light guiding layer is made of the second material.

6. An optical fingerprint sensor, comprising:
   an image sensor array;
   a collimator layer disposed above the image sensor array, the collimator array having an array of first apertures;
   a light guiding layer disposed on the collimator layer;
   a light source emitting light into the light guiding layer; and
   a sensing area disposed above the light guiding layer,
   wherein the light guiding layer allows a portion of the light from the light source to enter to the sensing area while directing the remaining portion of the light forward,
   wherein the light guiding layer having an array of prisms, and
   wherein each of the apertures has a side wall made of a first material, and is filled with a second material, wherein the refractive index of the first material is lower than that of the second material.

7. An optical fingerprint sensor, comprising:
   an image sensor array;
   a collimator layer disposed above the image sensor array, the collimator array having an array of first apertures;
   a light guiding layer disposed on the collimator layer;
   a light source emitting light into the light guiding layer; and
   a sensing area disposed above the light guiding layer,
   wherein the light guiding layer allows a portion of the light from the light source to enter to the sensing area while directing the remaining portion of the light forward,
   wherein the light guiding layer comprises an array of material blocks,
   an interface between any two adjacent material blocks is an inclined plane, and
   each inclined plane is located directly above one of the first apertures.

8. The optical fingerprint sensor as claimed in claim 7, wherein each inclined plane reflects a portion of the light to the sensing area and passes the remaining portion of the light.

9. The optical fingerprint sensor as claimed in claim 7, wherein the image sensor array comprises a plurality of image sensor units which receive the light beam reflected from the sensing area and transmitted through one of the first apertures.

10. The optical fingerprint sensor as claimed in claim 7, wherein each of the apertures has a side wall made of a first material, and is filled with a second material, wherein the refractive index of the first material is lower than that of the second material.

* * * * *